US006858347B2

United States Patent
Tanigawa et al.

(10) Patent No.: US 6,858,347 B2
(45) Date of Patent: Feb. 22, 2005

(54) PASTE TYPE POSITIVE ELECTRODE FOR ALKALINE STORAGE BATTERY, AND NICKEL-METAL HYDRIDE STORAGE BATTERY

(75) Inventors: Futoshi Tanigawa, Ikoma (JP); Akihiro Maeda, Fujisawa (JP); Yasushi Nakamura, Fujisawa (JP); Yoichi Izumi, Habikino (JP); Yoshitaka Dansui, Fujisawa (JP); Kohji Yuasa, Chigasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/752,375

(22) Filed: Dec. 29, 2000

(65) Prior Publication Data

US 2001/0033966 A1 Oct. 25, 2001

(30) Foreign Application Priority Data

Mar. 24, 2000 (JP) ........................................ 2000-084275
Sep. 28, 2000 (JP) ........................................ 2000-297499

(51) Int. Cl.$^7$ ................................................ H01M 4/52
(52) U.S. Cl. ................................................... 429/223
(58) Field of Search ............................... 429/222–224, 429/229, 218.1, 53

(56) References Cited

U.S. PATENT DOCUMENTS

| 3,899,350 | A | * | 8/1975 | Jackovitz et al. ............. 205/60 |
| 4,837,119 | A | * | 6/1989 | Ikoma et al. ................. 429/206 |
| 5,348,822 | A | * | 9/1994 | Ovshinsky et al. ....... 252/181.6 |
| 5,672,447 | A | | 9/1997 | Yamawaki et al. |
| 5,789,113 | A | * | 8/1998 | Joo et al. ..................... 429/223 |
| 6,083,642 | A | | 7/2000 | Kato et al. |
| 6,203,945 | B1 | * | 3/2001 | Baba et al. ................. 423/594 |

FOREIGN PATENT DOCUMENTS

| JP | 60254564 | A | 12/1985 | |
| JP | 61074261 | A | 4/1986 | |
| JP | 04026058 | A | 1/1992 | |
| JP | 08148145 | A | 6/1996 | |
| JP | 08203508 | A | * 8/1996 | ............ H01M/4/24 |
| JP | 09-161791 | | 6/1997 | |
| JP | 09-223500 | | 8/1997 | |
| JP | 11-031505 | | 2/1999 | |
| JP | 11-097008 | | 4/1999 | |
| JP | 11-149924 | | 6/1999 | |
| JP | 11219701 | A | 8/1999 | |
| JP | 2002-21401 | | 1/2000 | |

OTHER PUBLICATIONS

Linden, "Handbook of Batteries" McGraw–Hill, Inc., 2$^{nd}$ Edition, 1995, p. 33.1.*

* cited by examiner

*Primary Examiner*—Gregg Cantelmo
(74) *Attorney, Agent, or Firm*—Akin Gump Strauss Hauer & Feld, L.L.P.

(57) ABSTRACT

The paste type positive electrode of the present invention contains a first active material and a second active material. The first active material comprises X parts by weight of particulate nickel hydroxide with aX/100 parts by weight of cobalt oxyhydroxide carried thereon. The second active material comprises Y parts by weight of particulate nickel oxyhydroxide, of which an oxidation number of nickel is $\alpha$, with bY/100 parts by weight of cobalt oxyhydroxide carried thereon. Here, all the following relations are satisfied: (1) $2.5 \leq \alpha < 3.0$, (2) $0.01 \leq (aX/100+bY/100)/(X+Y) \leq 0.20$, (3) $0 < b \leq a \leq 10$ or $0 = b < a \leq 10$, and (4) $2.1 \leq (2X+\alpha Y)/(X+Y) < 2.2$.

9 Claims, 2 Drawing Sheets

QUANTITY OF AQUEOUS SOLUTION OF SODIUM HYPOCHLORITE (ml)

FIG. 1

QUANTITY OF AQUEOUS SOLUTION OF SODIUM HYPOCHLORITE (ml)

FIG. 2

PASTE TYPE POSITIVE ELECTRODE FOR ALKALINE STORAGE BATTERY, AND NICKEL-METAL HYDRIDE STORAGE BATTERY

BACKGROUND OF THE INVENTION

The present invention relates to a paste type positive electrode for alkaline storage batteries, as well as to a nickel-metal hydride storage battery.

Secondary batteries are mounted on most of portable apparatuses, such as cellular phones and laptop computers. Under such circumstances, development of a secondary battery having the higher capacity has strongly been desired. The positive electrode has been improved as discussed below to attain the higher capacity of alkaline storage batteries.

Both a sintered type positive electrode and a paste type positive electrode are applicable for the alkaline storage battery. The sintered type positive electrode has a substrate having pores of approximately 10 μm in diameter. The substrate is obtained by sintering a nickel powder and a core material (e.g. perforated metal sheet, etc), and has a small porosity of approximately 80%. This substrate is accordingly filled with a relatively small quantity of the active material. The paste type positive electrode, on the other hand, has a foamed nickel substrate having pores of approximately 500 μm, where the pore is communicating each other and arranged in a three-dimensional manner. The foamed nickel substrate has a large porosity of approximately 95%. This substrate is accordingly filled with a relatively large quantity of the active material. Namely the paste type positive electrode has a higher capacity.

The electrical conductivity of nickel hydroxide, which is the active material of the paste type positive electrode, varies with a variation in oxidation number of nickel: that is, high conductivity for the large oxidation number and low conductivity for the small oxidation number. The oxidation of nickel hydroxide in charging process of a battery thus proceeds smoothly, but the reduction in discharging process does not proceed smoothly, due to the lowered electrical conductivity in the terminal stage of discharging process. This causes an insufficient discharge. A conductive agent, such as a cobalt compound, is added to the active material, with a view to enhancing the electrical conductivity in the positive electrode and ensuring the sufficient discharge.

In the case where cobalt hydroxide is added to the active material, the first charging cycle after the manufacture of the battery causes cobalt oxyhydroxide having a good conductivity to deposit on the surface of nickel hydroxide as the active material. This ensures the favorable conductive networks (Japanese Laid-Open Patent Sho 61-74261). Cobalt oxyhydroxide is stable in a standard voltage range of the battery and keeps the conductive networks.

In an alkaline storage battery, the negative electrode generally has a greater capacity than the capacity of the positive electrode. The residual non-charged capacity of the negative electrode under the condition where the positive electrode is completely charged is referred to as the charge reservoir, and the residual charged capacity of the negative electrode under the condition where the positive electrode is completely discharged referred to as the discharge reservoir.

When the battery is excessively charged, the reaction as defined below occurs at the positive electrode to produce oxygen:

$$OH^- \rightarrow 1/2H_2O + 1/4O_2 + e^-$$

Oxygen reacts with the hydrogen absorbed in the negative electrode and is consumed:

$$MH \text{ (metal hydride)} + 1/4O_2 \rightarrow M \text{ (alloy)} + 1/2H_2O$$

$$M + H_2O + e^- \rightarrow MH + OH^-$$

The hydrogen storage alloy of the negative electrode hardly absorbs hydrogen in the terminal stage of charging process of a battery. The presence of the alloy that has not yet absorbed hydrogen as the charge reservoir effectively depresses the generation of gaseous hydrogen. This enables the battery to be sealed.

The following describes the discharge reservoir in the general paste type positive electrode including nickel, which is obtained by adding cobalt hydroxide as a conductive agent to nickel hydroxide functioning as the active material. The initial charging of the battery having this positive electrode changes cobalt hydroxide to cobalt oxyhydroxide. The electrical quantity stored in the negative electrode while this process becomes part of the discharge reservoir.

The capacity of nickel hydroxide is 289 mAh/g, and the capacity of cobalt hydroxide is 288 mAh/g. In the case where cobalt hydroxide in an amount of 10% by weight of nickel hydroxide is used, therefore, the discharge reservoir obtained is approximately one tenth of the capacity of the positive electrode.

The oxidation number of nickel in nickel hydroxide is initially 2 but rises to about 3.2 by charging of the battery, so that nickel hydroxide is changed to nickel oxyhydroxide. The discharge of the battery is concluded when the oxidation number of nickel decreases to about 2.2. The non-discharged nickel oxyhydroxide thus remains to give the discharge reservoir of approximately two tenths of the capacity of the positive electrode. The nickel-metal hydride storage battery accordingly has the total discharge reservoir of approximately three tenths of the capacity of the positive electrode.

The adequate quantity of the discharge reservoir is at most about one tenth of the capacity of the positive electrode. Namely the capacity corresponding to approximately two tenths of the capacity of the positive electrode are excessive in the negative electrode. In other words, the prior art battery includes a specific quantity of the hydrogen storage alloy that does not contribute to charging and discharging. Regulating the quantity of the discharge reservoir to the appropriate level desirably reduces the required quantity of the expensive hydrogen storage alloy and gives a battery of high energy density at a low manufacturing cost.

From these viewpoints, the positive electrode of the battery disclosed in Japanese Laid-Open Patent Sho 60-254564 includes nickel hydroxide, cobalt, and nickel oxyhydroxide required for oxidation of cobalt. This proposed battery has the reduced discharge reservoir accompanied with oxidation of cobalt. The positive electrodes of the batteries disclosed in Japanese Laid-Open Patent Hei 4-26058 and Hei 8-148145 include particulate nickel hydroxide with cobalt oxyhydroxide carried thereon.

The battery disclosed in Japanese Laid-Open Patent Hei 11-219701 seems to attain the greatest effect of reducing the discharge reservoir, among the various prior art batteries. The positive electrode of this proposed battery includes a first active material, which comprises particulate nickel hydroxide with cobalt oxyhydroxide carried thereon, and a second active material, which comprises particulate nickel oxyhydroxide with cobalt oxyhydroxide carried thereon. The weight ratio of the first active material to the second active material ranges from 90/10 to 60/40.

In the positive electrode of the battery disclosed in Japanese Laid-Open Patent Hei 11-219701, however, the oxidation number of nickel in the nickel oxyhydroxide of the second active material is not specified. The quantity of the discharge reservoir in the negative electrode depends upon not only the weight ratio of the first active material to the second active material but the oxidation number of nickel in the nickel oxyhydroxide of the second active material. Namely the appropriate quantity of the discharge reservoir is unknown in the battery disclosed in Japanese Laid-Open Patent Hei 11-219701.

BRIEF SUMMARY OF THE INVENTION

The present invention is directed to a paste type positive electrode for an alkaline storage battery. This positive electrode contains a first active material and a second active material. The first active material comprises X parts by weight of particulate nickel hydroxide with aX/100 parts by weight of cobalt oxyhydroxide carried thereon. The second active material comprises Y parts by weight of particulate nickel oxyhydroxide, of which an oxidation number of nickel is α, with bY/100 parts by weight of cobalt oxyhydroxide carried thereon. Here, all the following relations are satisfied:

$$2.5 \leq \alpha < 3.0 \tag{1}$$

$$0.01 \leq (aX/100 + bY/100)/(X+Y) \leq 0.20 \tag{2}$$

$$0 < b \leq a \leq 10 \text{ or } 0 = b < a \leq 10 \tag{3}$$

$$2.1 \leq (2X + \alpha Y)/(X+Y) < 2.2 \tag{4}$$

The present invention is also directed to another paste type positive electrode for an alkaline storage battery. This positive electrode contains a first active material, a second active material, and a cobalt hydroxide powder. The first active material comprises X parts by weight of particulate nickel hydroxide with aX/100 parts by weight of cobalt oxyhydroxide carried thereon. The second active material comprises Y parts by weight of particulate nickel oxyhydroxide, of which an oxidation number of nickel is α, with bY/100 parts by weight of cobalt oxyhydroxide carried thereon. The quantity of the cobalt hydroxide powder is c parts by weight. Here, all the following relations are satisfied:

$$2.5 \leq \alpha < 3.0 \tag{1}$$

$$0.01 \leq (aX/100 + bY/100 + c)/(X+Y) \leq 0.20 \tag{2'}$$

$$0 < b \leq a \leq 10 \text{ or } 0 = b < a \leq 10 \tag{3}$$

$$2.1 \leq (2X + \alpha Y + 2c \times 288/289)/(X+Y) < 2.2 \tag{4'}$$

The present invention is further directed to still another paste type positive electrode for an alkaline storage battery. This positive electrode contains a first active material, a second active material, and a cobalt oxyhydroxide powder. The first active material comprises X parts by weight of particulate nickel hydroxide with aX/100 parts by weight of cobalt oxyhydroxide carried thereon. The second active material comprises Y parts by weight of particulate nickel oxyhydroxide, of which an oxidation number of nickel is α, with bY/100 parts by weight of cobalt oxyhydroxide carried thereon. The quantity of the cobalt oxyhydroxide powder is d parts by weight. Here, all the following relations are satisfied:

$$2.5 \leq \alpha < 3.0 \tag{1}$$

$$0.01 \leq (aX/100 + bY/100 + d)/(X+Y) \leq 0.20 \tag{2''}$$

$$0 < b \leq a \leq 10 \text{ or } 0 = b < a \leq 10 \tag{3}$$

$$2.1 \leq (2X + \alpha Y)/(X+Y) < 2.2 \tag{4}$$

In the first active material and the second active material, the cobalt oxyhydroxide may be adhered to or deposited on the surface of the particulate nickel hydroxide or nickel oxyhydroxide. The surface of the particulate nickel hydroxide or nickel oxyhydroxide may be covered with the cobalt oxyhydroxide completely or partly.

In accordance with one preferable application of the present invention, at least one of the particulate nickel hydroxide and the particulate nickel oxyhydroxide is a solid solution containing at least one selected from the group consisting of cobalt, zinc, cadmium, magnesium, calcium, manganese, and aluminum. In this application, it is further preferable that the particulate nickel hydroxide and the particulate nickel oxyhydroxide contain 0.5 to 10% by weight of metal other than nickel relative to the quantity of the nickel hydroxide or the nickel oxyhydroxide, thereby forming solid solutions. These solid solutions may be called nickel based multi-metal hydroxide or oxyhydroxide. An excessively small content of the metal other than nickel tends to change the crystal structure of the active materials and thereby deteriorates the positive electrode to reduce cycle life of the battery. An excessively large content of the metal other than nickel, on the other hand, decreases the content of nickel in the positive electrode, thus lowering the battery capacity.

It is preferable that the oxidation number of cobalt in the cobalt oxyhydroxide included in the first active material and the second active material is greater than 3. Cobalt having the oxidation number of greater than 3 is hardly subjected to further oxidation in the battery, so that the quantity of the discharge reservoir is regulated to an appropriate level with a high accuracy.

The present invention is also directed to a nickel-metal hydride storage battery including a paste type positive electrode for an alkaline storage battery of the present invention, a negative electrode comprising a hydrogen storage alloy, a separator, an aqueous alkaline electrolyte, a sealing plate having a safety valve, and a battery case. The battery elements other than the positive electrode may be those used for the manufacture of prior art nickel-metal hydride storage batteries.

When the battery, which is in a completely charged condition and is supposed to have a nominal capacity at 1 C rate, is opened to receive a mercury electrode inserted therein and is continuously discharged at an electric current of 0.2 to 5 C rate until a potential of the negative electrode becomes −0.6 V and a potential of the positive electrode becomes −0.1 V with respect to the mercury electrode, it is preferable that a discharge capacity of the negative electrode is greater than but not greater than 1.1 times as large as a discharge capacity of the positive electrode. Here, when 1 C="x" Ah, an electric current of "y" C rate ($0.2 \leq y \leq 5$) means an electric current of "xy" A.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Embodiment 1

The positive electrode of embodiment 1 contains a first active material and a second active material. The first active material comprises X parts by weight of particulate nickel hydroxide with aX/100 parts by weight of cobalt oxyhydroxide carried thereon. The second active material comprises Y parts by weight of particulate nickel oxyhydroxide, of which an oxidation number of nickel is $\alpha$, with bY/100 parts by weight of cobalt oxyhydroxide carried thereon.

The positive electrode of this embodiment satisfies all the following relations:

$$2.5 \leq \alpha < 3.0 \tag{1}$$

$$0.01 \leq (aX/100 + bY/100)/(X+Y) \leq 0.20 \tag{2}$$

$$0 < b \leq a \leq 10 \text{ or } 0 = b < a \leq 10 \tag{3}$$

$$2.1 \leq (2X + \alpha Y)/(X+Y) < 2.2 \tag{4}$$

The oxidation number of nickel is defined as $2.5 \leq \alpha < 3.0$ because of the following. In the case where $2.0 < \alpha < 2.5$, a large quantity of the second active material is required to ensure the appropriate quantity of discharge reservoir. The second active material is obtained by further oxidation of the first active material. An increase in required quantity of the second active material increases the size of the manufacturing equipment and thereby raises the manufacturing cost. In the case where $3.0 \leq \alpha$, on the other hand, a large quantity of an oxidant is required, and the utilization efficiency of the oxidant is lowered. This also leads to an increase in manufacturing cost.

Relation (2) represents an appropriate range of the ratio of the total quantity of cobalt oxyhydroxide in the first active material and cobalt oxyhydroxide in the second active material to the total quantity of nickel hydroxide in the first active material and nickel oxyhydroxide in the second active material. When Relation (2) is satisfied, the positive electrode maintains a high energy density. The ratio of less than 0.01 does not allow formation of conductive networks between a core material and the active materials and between the active materials in the positive electrode. This lowers the utilization efficiency of the active materials and thereby the battery capacity. The ratio of greater than 0.2, on the other hand, causes a decrease in quantity of nickel hydroxide or nickel oxyhydroxide in the positive electrode and thereby the energy density of the positive electrode.

Relation (3) shows that the weight ratio (b) of cobalt oxyhydroxide to nickel oxyhydroxide in the second active material is less than or equal to the weight ratio (a) of cobalt oxyhydroxide to nickel hydroxide in the first active material. When Relations (1), (2), and (4) are satisfied, Y is smaller than X. When Relation (3) is further satisfied under such conditions, the second active material is surrounded by the first active material having a large quantity of cobalt oxyhydroxide on the surface thereof. Consequently, conductive networks are formed by means of the cobalt oxyhydroxide present on the surface of the first active material. This configuration ensures the high utilization efficiency of the active materials in the positive electrode.

When Relations (1), (2), and (4) are satisfied but Relation (3) is not satisfied, that is, when a<b, a large quantity of cobalt oxyhydroxide is present on the surface of the second active material, whose content in the positive electrode is smaller than the content of the first active material. This causes sparse conductive networks formed by cobalt oxyhydroxide in the positive electrode, thereby lowering the battery capacity and shortening the cycle life.

Relation (4) represents a preferable range of the mean oxidation number of nickel included in the positive electrode. Setting the mean oxidation number of nickel included in the positive electrode in this preferable range effectively depresses an increase in potential of the negative electrode and thus ensures the high rate discharge properties of the battery. This accordingly reduces a certain quantity of the hydrogen storage alloy corresponding to the excessive discharge reservoir.

When $(2X+\alpha Y)/(X+Y) < 2.1$, the quantity of discharge reservoir of the negative electrode becomes equal to or greater than one tenth of the capacity of the positive electrode. This results in the poorer effects of enhancing the capacity of the battery and reducing the use of the hydrogen storage alloy for the negative electrode. When $2.2 \leq (2X+\alpha Y)/(X+Y)$, on the other hand, the discharge capacity of the positive electrode becomes greater than the discharge capacity of the negative electrode.

Embodiment 2

The positive electrode of embodiment 2 includes cobalt hydroxide powder as a conductive agent to enhance the electrical conductivity in the positive electrode. This positive electrode is similar to the positive electrode of embodiment 1, except inclusion of c parts by weight of cobalt hydroxide powder and differences in part of the relations to be satisfied.

Namely the positive electrode of this embodiment includes "X+aX/100" parts by weight of the first active material, "Y+bY/100" parts by weight of the second active material, and c parts by weight of cobalt hydroxide powder. This positive electrode satisfies all the following relations:

$$2.5 \leq \alpha < 3.0 \tag{1}$$

$$0.01 \leq (aX/100 + bY/100 + c)/(X+Y) \leq 0.20 \tag{2'}$$

$$0 < b \leq a \leq 10 \text{ or } 0 = b < a \leq 10 \tag{3}$$

$$2.1 \leq (2X + \alpha Y + 2c \times 288/289)/(X+Y) < 2.2 \tag{4'}$$

This positive electrode contains a greater quantity of the cobalt compounds. The formation of sufficient conductive networks is thus ensured in the positive electrode and the battery capacity is maintained over a long time period.

Relation (2') represents an appropriate range of the ratio of the total quantity of cobalt oxyhydroxide in the first active material, cobalt oxyhydroxide in the second active material and additional cobalt hydroxide to the total quantity of nickel hydroxide in the first active material and nickel oxyhydroxide in the second active material. When Relation (2') is satisfied, the positive electrode maintains a high energy density. The ratio of less than 0.01 does not allow formation of conductive networks between a core material and the active materials and between the active materials in the positive electrode. This lowers the utilization efficiency of the active materials and thereby the battery capacity. The ratio of greater than 0.2, on the other hand, causes a decrease in quantity of nickel hydroxide or nickel oxyhydroxide in the positive electrode and thereby the energy density of the positive electrode.

The cobalt hydroxide powder is oxidized by cobalt oxyhydroxide or nickel oxyhydroxide after the assembly of the battery. Relation (4') of this embodiment is accordingly modification of Relation (4) of embodiment 1.

Embodiment 3

The positive electrode of embodiment 3 includes cobalt oxyhydroxide powder as an conductive agent to enhance the electrical conductivity in the positive electrode. This positive electrode is similar to the positive electrode of embodiment 1, except inclusion of d parts by weight of cobalt oxyhydroxide powder and difference in part of the relations to be satisfied.

Namely the positive electrode of this embodiment includes "X+aX/100" parts by weight of the first active material, "Y+bY/100" parts by weight of the second active material, and d parts by weight of cobalt oxyhydroxide powder. This positive electrode satisfies all the following relations:

$$2.5 \leq \alpha < 3.0 \quad (1)$$

$$0.01 \leq (aX/100 + bY/100 + d)/(X+Y) \leq 0.20 \quad (2'')$$

$$0 < b \leq a \leq 10 \text{ or } 0 = b < a \leq 10 \quad (3)$$

$$2.1 \leq (2X + \alpha Y)/(X+Y) < 2.2 \quad (4)$$

This positive electrode also contains a greater quantity of the cobalt compounds. The formation of sufficient conductive networks is thus ensured in the positive electrode and the battery capacity is maintained over a long time period.

Relation (2") represents an appropriate range of the ratio of the total quantity of cobalt oxyhydroxide in the first active material, cobalt oxyhydroxide in the second active material and additional cobalt oxyhydroxide to the total quantity of nickel hydroxide in the first active material and nickel oxyhydroxide in the second active material. When Relation (2") is satisfied, the positive electrode maintains a high energy density. The ratio of less than 0.01 does not allow formation of conductive networks between a core material and the active materials and between the active materials in the positive electrode. This lowers the utilization efficiency of the active materials and thereby the battery capacity. The ratio of greater than 0.2, on the other hand, causes a decrease in quantity of nickel hydroxide or nickel oxyhydroxide in the positive electrode and thereby the energy density of the positive electrode.

Since cobalt oxyhydroxide comprises cobalt having a large oxidation number, modification of Relation (4) is not required.

The present invention is described more concretely with some examples, although the present invention is not restricted to these examples in any sense.

EXAMPLES (i) Oxidation Experiment of Particulate Nickel Hydroxide 100 g of Powder A, which was a particulate nickel hydroxide solid solution (mean particle diameter: 10 $\mu$m) containing 5% by weight of zinc was added to pure water, and was further added 100 ml of an aqueous solution of sodium hypochlorite(NaClO) (effective chlorine content: 12% by weight) as an oxidant to the obtained mixture. The whole mixture was sufficiently stirred. The powder was then separated from the mixture, washed with water, and dried. The obtained powder was B.

Powders C, D, E, and F were obtained according to the above procedure, except that the quantity of the aqueous solution of sodium hypochlorite was changed to 200 ml, 300 ml, 600 ml, and 1000 ml, respectively.

The oxidation number of nickel in each powder of B through F was determined by oxidation-reduction titration (iodimetry). The relation between the quantity of the aqueous solution of sodium hypochlorite and the oxidation number of nickel is shown in FIG. 1.

Figure 1:
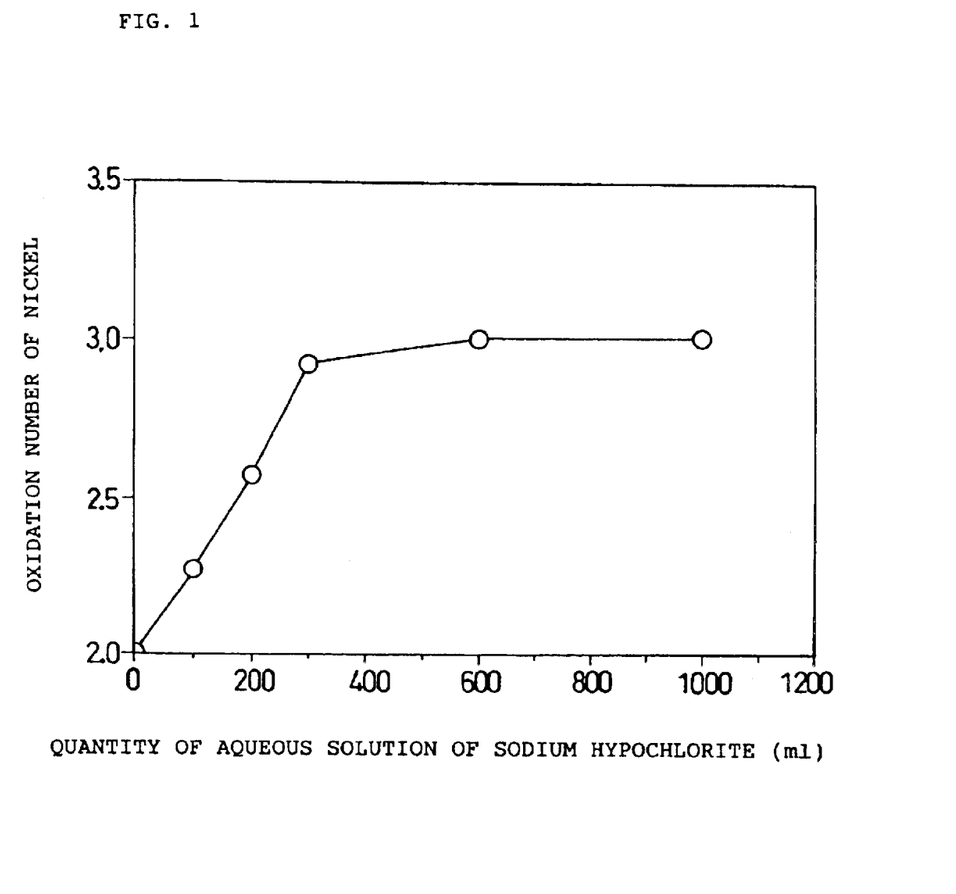
FIG. 1 is a graph showing a relation between the oxidation number of nickel in nickel oxyhydroxide, and the quantity of an aqueous solution of sodium hypochlorite required to oxidize nickel hydroxide.

In the graph of FIG. 1, the oxidation number of nickel rises to 2.92 with an increase in quantity of the aqueous solution of sodium hypochlorite to 300 ml. Using 1000 ml of the aqueous solution of sodium hypochlorite increases the oxidation number of nickel only to 3.02. According to these results, it is preferable to set the oxidation number of nickel in the nickel oxyhydroxide of the second active material smaller than 3.0, from the viewpoints of the efficiency of oxidation reaction and the manufacturing cost.

(ii) Preparation of Active Materials (a) Powder G

Powder G was prepared, which was a particulate nickel hydroxide solid solution containing 5% by weight of zinc with cobalt hydroxide carried thereon, where the quantity of the cobalt hydroxide was 5% by weight to the nickel hydroxide. Specifically, the content of pure nickel hydroxide in the solid solution is 92.4% by weight.

(b) Powder H

Powder G was moistened with an aqueous solution containing 48% by weight of sodium hydroxide. The moistened powder G was subsequently dried at a temperature of 100° C. under the regulated humidity with a supply of oxygen. The obtained powder was washed with water and dried. This process oxidized cobalt hydroxide in Powder G to cobalt oxyhydroxide.

The resulting active material was Powder H including particulate nickel hydroxide solid solution containing 5% by weight of zinc with cobalt oxyhydroxide carried thereon, where the quantity of the cobalt oxyhydroxide is 5% by weight to the nickel hydroxide. The active material Powder H had the conductivity in the compressed form of approximately 0.1 S/cm. The oxidation-reduction titration determined the oxidation number of cobalt in the cobalt oxyhydroxide as 3.19.

(c) Powder I 100 g of Powder A, which was a particulate nickel hydroxide solid solution was added to pure water, and was further added 300 ml of an aqueous solution of sodium hypochlorite (effective chlorine content: 12% by weight) to the mixture. The whole mixture was sufficiently stirred. The powder was then separated from the mixture, washed with water, and dried. The obtained nickel oxyhydroxide solid solution was Powder I. The oxidation-reduction titration determined the oxidation number of nickel in Powder I as 2.92.

(d) Powder J

Powder I was mixed with an aqueous solution containing 30% by weight of sodium hydroxide heated at 60° C., and was added 1 mol/liter of an aqueous solution of cobalt sulfate dropwise with being stirred well. Consequently, cobalt oxyhydroxide in an amount of 5% by weight to the nickel oxyhydroxide deposited on the surface of Powder I. The cobalt sulfate was changed to ionic cobalt in the aqueous solution of sodium hydroxide and subsequently deposited in the form of cobalt oxyhydroxide on the surface of Powder I. The powder was separated from the mixture, washed with water, and dried. The obtained powder was J.

Powder J was heated in an aqueous solution of acetic acid, so as to elute the nickel component of Powder J into the aqueous solution. The non-eluted portion was examined by ICP analysis (inductively coupled plasma spectrometry), X-ray diffraction, and oxidation-reduction titration. The non-eluted potion was cobalt oxyhydroxide where the oxidation number of cobalt was 3.12.

This means that Powder J includes particulate nickel oxyhydroxide solid solution containing 5% by weight of zinc with cobalt oxyhydroxide carried thereon, where the quantity of the cobalt oxyhydroxide is 5% by weight to the nickel oxyhydroxide. The theoretical calculation gives the oxidation number of nickel in the nickel oxyhydroxide equal to 2.79 and the oxidation number of cobalt in the cobalt oxyhydroxide equal to 3.12.

(iii) Manufacture of Batteries

Battery of Example 1

Powder H and Powder J were mixed at a weight ratio of 85:15. 0.5 parts by weight of yttrium oxide, 0.1 part by weight of carboxymethyl cellulose (CMC) as a thickening agent, and 0.2 parts by weight of polytetrafluoroethylene (PTFE) as a binding agent were added to 100 parts by weight of the powder mixture. Subsequently, a predetermined quantity of pure water was added to the whole mixture to yield a paste. A foamed nickel sheet was filled with the paste, dried, and pressed to give a positive electrode 1. The mean oxidation number of nickel included in the positive electrode 1 was 2.12 $\{=(2\times85\times0.924+2.79\times15\times0.924)/(85\times0.924+15\times0.924)\}$.

A negative electrode 1 was obtained by applying a paste comprising a hydrogen storage alloy, carbon black, a thickening agent, and a binding agent onto a punched metal, drying the paste, and applying a pressure.

The negative electrode 1 had a theoretical capacity of 1.4 times as much as the theoretical capacity of the positive electrode 1. The theoretical capacity of the positive electrode ($C^0_p$) was calculated by multiplying the weight of nickel hydroxide included in the positive electrode by the electric capacity of the nickel hydroxide per unit weight. The theoretical capacity of the negative electrode ($C^0_n$) was determined on the basis of the value of $C^0_p$. On the assumption that nickel hydroxide is subjected to the one-electron reaction, the electric capacity of nickel hydroxide is 289 mAh/g.

The positive electrode 1 and the negative electrode 1 were laid one on top of the other with a predetermined separator put between them and rolled up to form a spiral electrode group. The electrode group assembled with positive and negative collectors on the upper and lower faces thereof was inserted into a metal jacket. The negative electrode collector was electrically connected with a bottom plate of the metal jacket, and the positive electrode collector was electrically connected with a predetermined place of a sealing plate with a safety valve. An electrolyte was injected into the metal jacket and the opening of the metal jacket was sealed, so as to give the battery of Example 1 according to the present invention.

Battery of Example 2

The battery of Example 2 was manufactured in the same manner as the battery of Example 1, except that the battery of Example 2 used a negative electrode 2 having a theoretical capacity of 1.65 times as much as the theoretical capacity of the positive electrode 1.

Battery of Example 3

A positive electrode 2 was prepared in the same manner as the positive electrode 1, except that Powder H and Powder I were mixed at a weight ratio of 85:15 in the positive electrode 2. The battery of Example 3 was manufactured in the same manner as the battery of Example 1, except that the battery of Example 3 used a negative electrode 3 having a theoretical capacity of 1.4 times as much as the theoretical capacity of the positive electrode 2.

In the positive electrode 2, the ratio of the total weight of cobalt oxyhydroxide in the first active material and cobalt oxyhydroxide in the second active material to the total weight of nickel hydroxide in the first active material and nickel oxyhydroxide in the second active material was $0.04\{=(85\times5/100+15\times0/100)/(85+15)\}$. The mean oxidation number of nickel included in the positive electrode 2 was $2.14\{=(2\times85\times0.924+2.92\times15\times0.924)/(100\times0.924)\}$.

Batteries of Examples 4 through 7

The contents a and b of cobalt oxyhydroxide in the respective active materials were varied while keeping a=b. The active materials were prepared to have the varying ratios of the total weight of cobalt oxyhydroxide in the first active material and cobalt oxyhydroxide in the second active material to the total weight of nickel hydroxide in the first active material and nickel oxyhydroxide in the second active material equal to 0.01, 0.03, 0.07, 0.10, 0.15, and 0.20. The batteries of Examples 4 through 9 were manufactured in the same manner as the battery of Example 1, except using these active materials. The first active material and the second active material included in the positive electrodes of the batteries of Examples 4 through 9 accordingly have an identical content of cobalt oxyhydroxide.

Batteries of Comparative Examples 10 and 11

A positive electrode 3 was prepared in the same manner as the positive electrode 1, except that the positive electrode 3 included only Powder G as the active material. The batteries of Comparative Examples 10 and 11 were manufactured in the same manner as the batteries of Examples 1 and 2, except that the batteries of Comparative Examples 10 and 11 had the positive electrode 3 and respectively used negative electrodes 4 and 5 having theoretical capacities of 1.4 times and 1.65 times as much as the theoretical capacity of the positive electrode 3.

Battery of Comparative Example 12

A positive electrode 4 was prepared in the same manner as the positive electrode 1, except that the positive electrode 4 included only Powder H as the active material. The battery of Comparative Example 12 was manufactured in the same manner as the battery of Example 1, except that the battery of Comparative Example 12 had the positive electrode 4 and used a negative electrode 6 having a theoretical capacity of 1.4 times as much as the theoretical capacity of the positive electrode 4.

Battery of Comparative Example 13

Powder K was obtained by treating 100 g of Powder G in a mixture of 1000 ml of an aqueous solution containing 30% by weight of sodium hydroxide, and 1000 ml of an aqueous solution containing 12% by weight of sodium hypochlorite for ten minutes with stirring. A positive electrode 5 was prepared in the same manner as the positive electrode 1, except that Powder H and Powder K were mixed at a weight ratio of 75:25 in the positive electrode 5. The battery of Comparative Example 13 was manufactured in the same manner as the battery of Example 1, except that the battery of Comparative Example 13 had the positive electrode 5 and used a negative electrode 7 having a theoretical capacity of 1.4 times as much as the theoretical capacity of the positive electrode 5. The battery of Comparative Example 13 is identical with the battery disclosed in Japanese Laid-Open Patent Hei 11-219701.

The batteries of examples and comparative examples manufactured as above are all nickel-metal hydride storage batteries of 4/5SC size. A hydrophilized polypropylene non-woven fabric was applied for the separator, and an aqueous alkaline solution obtained by dissolving 40 g/liter of lithium hydroxide monohydrate ($LiOH \cdot H_2O$) in an aqueous solution containing 7 mol/liter of KOH was applied for the electrolyte. The space in all the batteries was identical.

(iv) Pre-treatment of Batteries

The batteries of examples and comparative examples were left 24 hours after the manufacture. Each of the batteries was charged with the electric current of 0.1 A at 20° C. for 30 hours and then left at 20° C. for 1 hour. Each battery was subsequently discharged until a voltage of the battery is reduced to 1 V at the electric current of 0.4 A at 20° C. This cycle was repeated twice, and the battery was subjected to an aging process at 45° C. for one week. This gave batteries for evaluation.

(v) Battery Capacities

Each of the batteries for evaluation was charged with the electric current of 0.2 A at 20° C. for 15 hours and then left at 20° C. for 1 hour. Each battery was subsequently discharged until a voltage of the battery is reduced to 1 V at the electric current of 0.4 A at 20° C. The battery was again charged in the previous manner and discharged at the electric current of 10 A. The battery capacities at the discharge electric current of 0.4 A and 10 A were calculated from the respective discharge times. A percent rate (%) was obtained by dividing the battery capacity $C_{10A}$ at the discharge electric current of 10 A by the battery capacity $C_{0.4A}$ at the discharge electric current of 0.4 A. A part of the results thus obtained are shown in Table 1 and 2.

(vi) Internal Pressure of Batteries

A hole was formed on the bottom of each of the batteries for evaluation in the completely discharged condition. After a pressure sensor was inserted into the hole, the hole was sealed. Each battery was charged at the electric current of 2.0 A at 20° C. for 1.2 hours. The maximum pressure $P_{max}$ (kg/cm$^2$) in this charging process was measured. A part of the results thus obtained are shown in Table 1 and 2.

(vii) Measurement of Discharge Reservoir

The upper portion and the bottom portion of the metal jacket of each of the batteries in the completely charged condition were opened, and the battery was soaked in the electrolyte in a beaker. A mercury electrode (Hg/HgO) was inserted as a reference electrode in the beaker. The potentials of the positive electrode and the negative electrode relative to the reference electrode were measured. The battery was continuously discharged at the electric current of 0.4 A to produce hydrogen from the positive electrode and then oxygen from the negative electrode.

The discharge reservoir $R_{dis}$ (mAh) was calculated by subtracting the electric quantity (the capacity of the positive electrode: $C_p$) to vary the potential of the positive electrode from approximately 0.5 V to −0.1 V (relative to Hg/HgO) from the electric quantity (the capacity of the negative electrode: $C_n$) to vary the potential of the negative electrode from approximately −0.9 V to −0.6 V (relative to Hg/HgO). The discharge reservoir $R_{dis}$ (mAh) thus obtained was divided by the capacity $C_p$ (mAh) of the positive electrode to be expressed as a percent rate (%: relative to the capacity of the positive electrode). A part of the results thus obtained are shown in Table 1 and 2.

(viii) Capacity Maintenance Rate

Under the charging control (ΔT/Δt) detecting a temperature rise per unit time, each of the batteries was subjected to repeated cycles at 20° C. Each of the cycles charged the battery at the electric current of 4.0 A, left the battery one hour, and discharged the battery until the voltage of the battery was reduced to 0.6 V at the electric current of 10 A. The percent rate (%: relative to the initial capacity) was obtained by dividing the discharge capacity $C_{500}$ at the 500$^{th}$ cycle by the initial discharge capacity $C_{ini}$. A part of the results thus obtained are shown in Table 1 and 2.

TABLE 1

| Examples | $C_{On} \div C_{Op}$ | $C_{0.4A}$ (mAh) | $C_{10A} \div C_{0.4A} \times 100(\%)$ | $P_{max}$ (kg/cm$^2$) | $R_{dis} \div C_p \times 100(\%)$ | $C_{500} \div C_{ini} \times 100(\%)$ |
|---|---|---|---|---|---|---|
| Battery 1 | 1.40 | 2300 | 97.3 | 6.0 | 5 | 95 |
| Battery 2 | 1.65 | 2000 | 97.4 | 2.5 | 5 | 99 |
| Battery 3 | 1.40 | 2325 | 96.7 | 6.5 | 5 | 94 |

TABLE 2

| Comparative Examples | $C_{On} \div C_{Op}$ | $C_{0.4A}$ (mAh) | $C_{10A} \div C_{0.4A} \times 100(\%)$ | $P_{max}$ (kg/cm$^2$) | $R_{dis} \div C_p \times 100(\%)$ | $C_{500} \div C_{ini} \times 100(\%)$ |
|---|---|---|---|---|---|---|
| Battery 10 | 1.40 | 2300 | 97.5 | 19.0 | 25 | 62 |
| Battery 11 | 1.65 | 2000 | 97.3 | 6.5 | 25 | 95 |
| Battery 12 | 1.40 | 2300 | 97.4 | 15.5 | 20 | 79 |
| Battery 13 | 1.40 | 2185 | 98.1 | 7.0 | −5 | 88 |

As clearly understood from Table 1 and 2, the battery of Example 1 keeps the high rate discharge property and the high capacity maintenance rate even when the capacity of the negative electrode is reduced, compared with the batteries of comparative examples. This shows that the reduced discharge reservoir does not deteriorate the discharge properties of the battery of Example 1 and that an adequate quantity of charge reservoir is ensured even under the condition of a small capacity of the negative electrode. The battery of Example 2 has a longer life, because of the greater quantity of charge reservoir. The battery of Example 3 has the properties substantially equivalent to those of the battery of Example 1.

The battery of Comparative Example 13 having the equivalent capacity of the positive electrode to that of the battery of Example 1, on the other hand, has an inappropriate discharge reservoir and thereby the low battery capacity and the low capacity maintenance rate. This is ascribed to the fact that the discharge capacity of the negative electrode is less than the discharge capacity of the positive electrode and that the negative electrode is exposed to a potential causing corrosion of the negative electrode.

Figure 2:
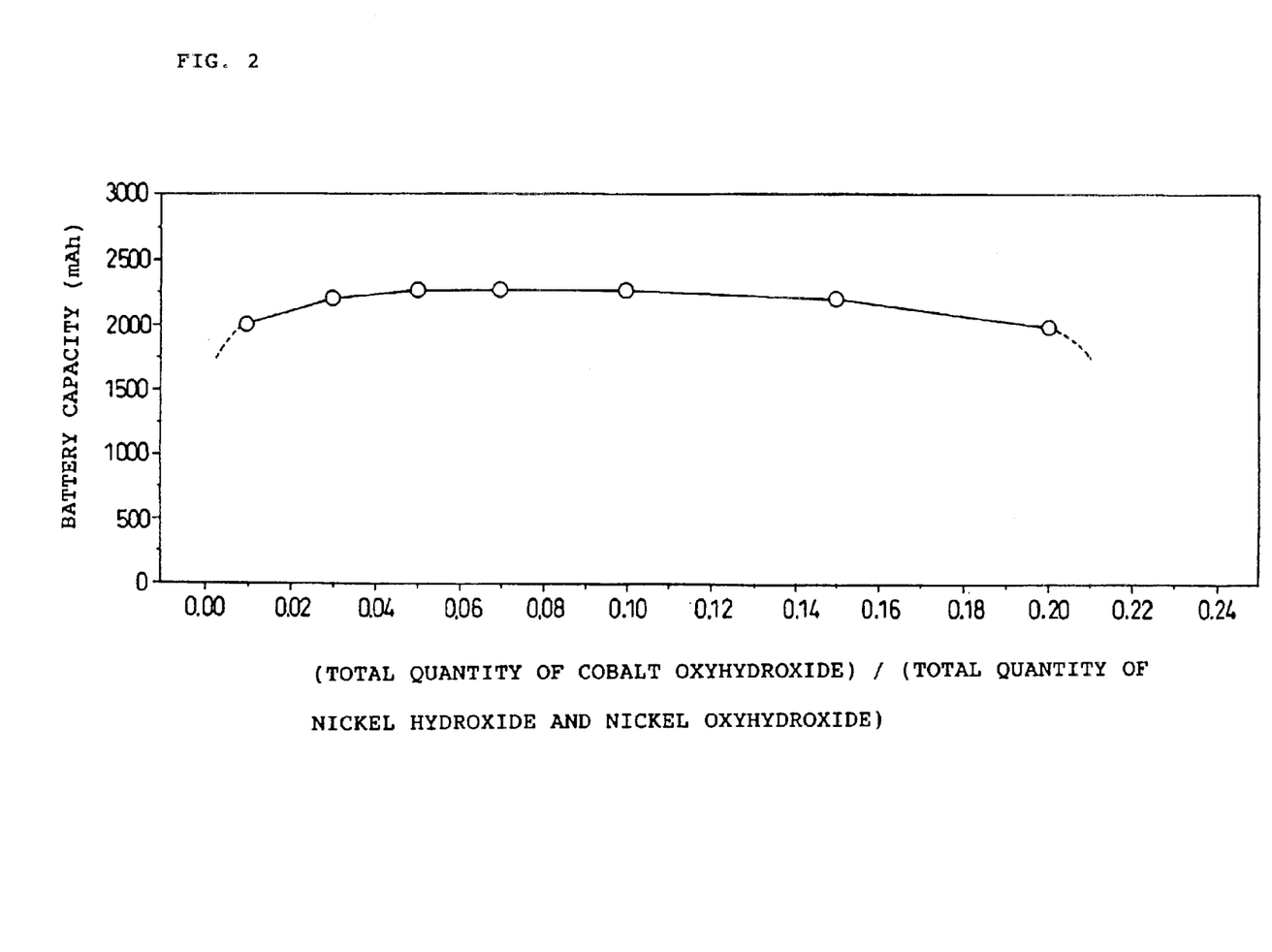
FIG. 2 is a graph showing a relation between the battery capacity, and the ratio of the total quantity of cobalt oxyhydroxide in the first active material and cobalt oxyhydroxide in the second active material to the total quantity of nickel hydroxide in the first active material and nickel oxyhydroxide in the second active material.

The capacities of the batteries of Example 1 and Examples 4 through 7 are shown in FIG. 2. The graph of FIG. 2 shows the relation between the battery capacity and the ratio of the total quantity of cobalt oxyhydroxide in the first active material and cobalt oxyhydroxide in the second active material to the total quantity of nickel hydroxide in the first active material and nickel oxyhydroxide in the second active material.

The results of FIG. 2 show that the battery capacity is low when the ratio is less than 0.01 or greater than 0.2. This is ascribed to the small energy density (density of active material×utilization efficiency of active material) of the positive electrode.

The difference in battery properties shown in Table 1 and 2 is ascribed to the difference in oxidation number of nickel included in the positive electrode active material and to the difference between the discharge reservoir and the charge reservoir varying with mixing ratios of the first active material to the second active material. Accordingly, when the nickel hydroxide solid solution powder contains elements like cobalt, zinc, cadmium, magnesium, calcium, manganese, and aluminum, the intrinsic effects of the respective elements exert independently.

As described above, by using a paste type positive electrode for an alkaline storage battery in accordance with the present invention, it become possible to control discharge reservoir in an appropriate quantity. Accordingly, a nickel-metal hydride storage battery having a high capacity and a long cycle life is manufactured at a low cost.

Although the present invention has been described in terms of the presently preferred embodiments, it is to be understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alternations and modifications as fall within the true spirit and scope of the invention.

What is claimed is:

1. A nickel metal-hydride storage battery comprising a paste type positive electrode containing a first active material and a second active material, wherein said first active material comprises X parts by weight of particulate nickel hydroxide with aX/100 parts by weight of cobalt oxyhydroxide carried thereon, and said second active material comprises Y parts by weight of particulate nickel oxyhydroxide, of which an oxidation number of nickel is α, with bY/100 parts by weight of cobalt oxyhydroxide carried thereon, all the following relationships being satisfied:

$$2.6 \leq \alpha 2.92 \tag{1}$$

$$0.01 \leq (aX/100 + bY/100)/(X+Y) \leq 0.20 \tag{2}$$

$$0 < b \leq a \leq 10 \text{ or } 0 = b < a \leq 10 \tag{3}$$

$$2.1 \leq (2X + \alpha Y)/(X+Y) < 2.2; \tag{4}$$

and wherein an oxidation number of cobalt in said cobalt oxyhydroxide included in said first active material and said second active material is greater than 3.

2. The nickel metal-hydride storage battery in accordance with claim 1, wherein at least one of said particulate nickel hydroxide and said particulate nickel oxyhydroxide is a solid solution containing at least one selected from the group consisting of cobalt, zinc, cadmium, magnesium, calcium, manganese, and aluminum.

3. The nickel-metal hydride storage battery in accordance with claim 1, further comprising a negative electrode comprising a hydrogen storage alloy, a separator, an aqueous alkaline electrolyte, a sealing plate having a safety valve, and a battery case, wherein a discharge capacity of said negative electrode is greater than a discharge capacity of said positive electrode but not greater than 1.1 times as large as a discharge capacity of said positive electrode when said battery, when in a completely charged condition and having a nominal capacity at 1 C, is continuously discharged at an electric current rate of 0.2 to 5 C until a potential of said negative electrode becomes −0.6 V and a potential of said positive electrode becomes −0.1 V with respect to a mercury reference electrode.

4. A nickel metal-hydride storage battery comprising a paste type positive electrode containing a first active material and a second active material, wherein said first active material comprises X parts by weight of particulate nickel hydroxide with aX/100 parts by weight of cobalt oxyhydroxide carried thereon, and said second active material comprises Y parts by weight of particulate nickel oxyhydroxide, of which an oxidation number of nickel is α, with bY/100 parts by weight of cobalt oxyhydroxide carried thereon, all the following relationships being satisfied:

$$2.6 \leq \alpha \leq 2.92 \tag{1}$$

$$0.01 \leq (aX/100 + bY/100)/(X+Y) \leq 0.20 \tag{2}$$

$$0 b < a \leq 10 \text{ or } 0 = b < a \leq 10 \tag{3}$$

$$2.1 \leq (2X + \alpha Y)/(X+Y) < 2.2; \tag{4}$$

wherein an oxidation number of cobalt in said cobalt oxyhydroxide included in said first active material and said second active material is greater than 3 and the paste type positive electrode further comprises a cobalt hydroxide powder, wherein a quantity of the cobalt hydroxide powder is c parts by weight, the following additional relationships being satisfied:

$$0.01 \leq (aX/100 bY/100 + c)/(X+Y) \leq 0.20 \tag{5}$$

$$2.1 \leq (2X + \alpha Y + 2cx288/289)/(X+Y) < 2.2. \tag{6}$$

5. The nickel metal-hydride storage battery in accordance with claim 4, wherein at least one of said particulate nickel hydroxide and said particulate nickel oxyhydroxide is a solid solution containing at least one selected from the group consisting of cobalt, zinc, cadmium, magnesium, calcium, manganese, and aluminum.

6. The nickel-metal hydride storage battery in accordance with claim 4, further comprising a negative electrode comprising a hydrogen storage alloy, a separator, an aqueous alkaline electrolyte, a sealing plate having a safety valve, and a batter case, wherein a discharge capacity of said negative electrode is greater than a discharge capacity of said positive electrode but not greater than 1.1 times as large as a discharge capacity of said positive electrode when said battery, when in a completely charged condition and having a nominal capacity at 1 C, is continuously discharged at an electric current rate of 0.2 to 5 C until a potential of said negative electrode becomes −0.6 V and a potential of said positive electrode becomes −0.1 V with respect to a mercury reference electrode.

7. A nickel metal-hydride storage battery comprising a paste type positive electrode containing a first active material and a second active material, wherein said first active material comprises X parts by weight of particulate nickel hydroxide with aX/100 parts by weight of cobalt oxyhydroxide carried thereon, and said second active material comprises Y parts by weight of particulate nickel oxyhydroxide, of which an oxidation number of nickel is α, with bY/100 parts by weight of cobalt oxyhydroxide carried thereon, all the following relationships being satisfied:

$$2.6 \leq \alpha \leq 2.92 \tag{1}$$

$$0.01 \leq (aX/100 + bY/100)/(X+Y) \leq 0.20 \tag{2}$$

$$0 < b \leq a \leq 10 \text{ or } 0 = b < a \leq 10 \tag{3}$$

$$2.1 \leq (2X + \alpha Y)/(X+Y) < 2.2; \tag{4}$$

wherein an oxidation number of cobalt in said cobalt oxyhydroxide included in said first active material and said second active material is greater than 3 and the paste type positive electrode further comprises a cobalt oxyhydroxide powder, wherein a quantity of the cobalt oxyhydroxide powder is d parts by weight, the following additional relationship being satisfied:

$$0.01 \leq (aX/100 + bY/100 + d)/(X+Y) \leq 0.20. \tag{5}$$

8. The nickel metal hydride storage battery in accordance with claim 7, wherein at least one of said particulate nickel hydroxide and said particulate nickel oxyhydroxide is a solid solution containing at least one selected from the group consisting of cobalt, zinc, cadmium, magnesium, calcium, manganese, and aluminum.

9. The nickel-metal hydride storage battery in accordance with claim 7, further comprising a negative electrode comprising a hydrogen storage alloy, a separator, an aqueous alkaline electrolyte, a sealing plate having a safety valve, and a battery case, wherein a discharge capacity of said negative electrode is greater than a discharge capacity of said positive electrode but not greater than 1.1 times as large as a discharge capacity of said positive electrode when said battery, when in a completely charged condition and having a nominal capacity at 1 C, is continuously discharged at an electric current rate of 0.2 to 5 C until a potential of said negative electrode becomes −0.6 V and a potential of said positive electrode becomes −0.1 V with respect to a mercury reference electrode.

* * * * *

UNITED STATES PATENT AND TRADEMARK OFFICE
CERTIFICATE OF CORRECTION

PATENT NO. : 6,858,347 B2
DATED : February 22, 2005
INVENTOR(S) : Futoshi Tanigawa et al.

It is certified that error appears in the above-identified patent and that said Letters Patent is hereby corrected as shown below:

<u>Title page,</u>
Item [56], References Cited, FOREIGN PATENT DOCUMENTS, last reference should read -- JP         2000-21401            1/2000 --.

Signed and Sealed this

Nineteenth Day of July, 2005

JON W. DUDAS
*Director of the United States Patent and Trademark Office*